United States Patent
Chen et al.

(10) Patent No.: US 9,502,162 B2
(45) Date of Patent: Nov. 22, 2016

(54) POSITIVE TEMPERATURE COEFFICIENT CIRCUIT PROTECTION DEVICE

(71) Applicant: FUZETEC TECHNOLOGY CO., LTD., New Taipei (TW)

(72) Inventors: Jack Jih-Sang Chen, New Taipei (TW); Chang-Hung Jiang, New Taipei (TW)

(73) Assignee: Fuzetec Technology Co., Ltd., New Taipei (TW)

( * ) Notice: Subject to any disclaimer, the term of this patent is extended or adjusted under 35 U.S.C. 154(b) by 300 days.

(21) Appl. No.: 14/509,116

(22) Filed: Oct. 8, 2014

(65) Prior Publication Data

US 2016/0105016 A1 Apr. 14, 2016

(51) Int. Cl.
- *H01C 7/02* (2006.01)
- *H02H 5/04* (2006.01)
- *H01B 1/20* (2006.01)

(52) U.S. Cl.
CPC ........ *H01C 7/02* (2013.01); *H01B 1/20* (2013.01); *H02H 5/04* (2013.01)

(58) Field of Classification Search
CPC .......... H01C 7/02; H01C 7/022; H02H 5/04
See application file for complete search history.

(56) References Cited

U.S. PATENT DOCUMENTS

| | | | | |
|---|---|---|---|---|
| 8,368,504 B1 * | 2/2013 | Chen | | H01C 7/02 252/511 |
| 8,502,638 B1 * | 8/2013 | Sha | | H01C 7/008 338/13 |
| 8,558,655 B1 * | 10/2013 | Chen | | H01C 7/027 338/13 |
| 2006/0226397 A1 * | 10/2006 | Chen | | H01B 1/24 252/500 |
| 2008/0074232 A1 * | 3/2008 | Chen | | H01C 7/027 338/22 R |
| 2008/0116424 A1 * | 5/2008 | Bandyopadhyay | | C08K 3/08 252/513 |

* cited by examiner

*Primary Examiner* — Stephen W Jackson
*Assistant Examiner* — Christopher Clark
(74) *Attorney, Agent, or Firm* — McNees Wallace & Nurick LLC

(57) ABSTRACT

A PTC circuit protection device includes a PTC polymer material and two electrodes attached to the PTC polymer material. The PTC polymer material includes a polymer matrix and a particulate conductive filler dispersed in the polymer matrix, the conductive filler including conductive non-carbonaceous particles and conductive carbon particles. The conductive carbon particles have an average particle size ranging from 40 to 100 nm, a DBP oil-absorption ranging from 60 to 120 cc/100 g, and a volatile content ranging from 0.2 to 2.0 wt %. The conductive carbon particles are in an amount ranging from 1 to 14 wt % based on the total weight of the PTC polymer material.

7 Claims, 1 Drawing Sheet

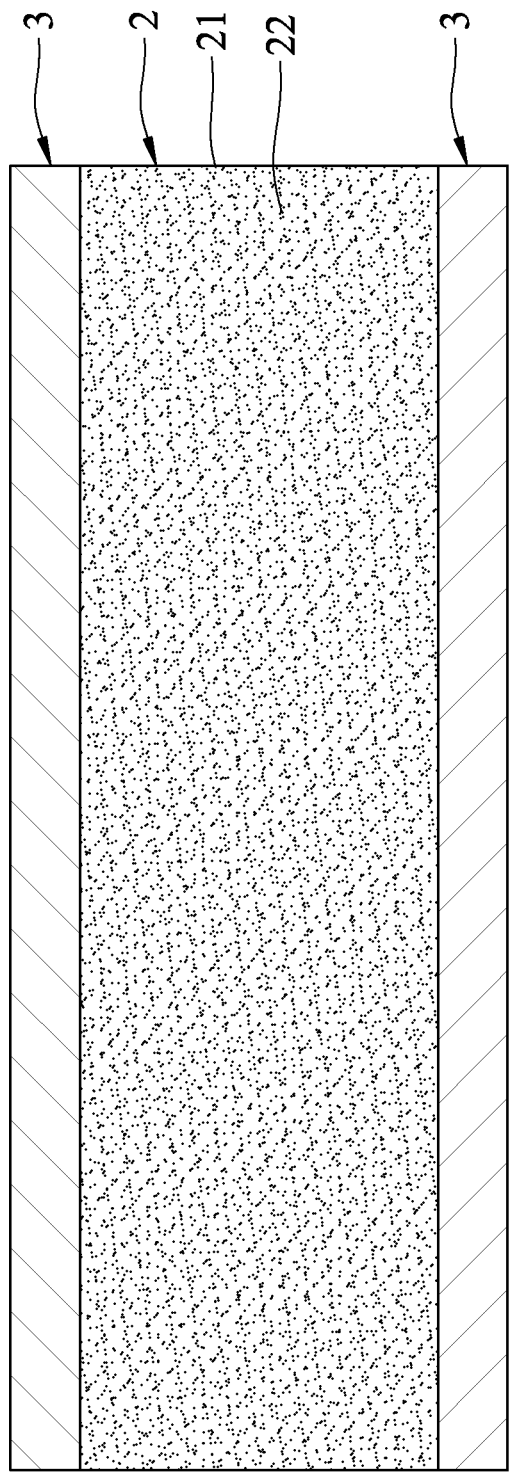

POSITIVE TEMPERATURE COEFFICIENT CIRCUIT PROTECTION DEVICE

FIELD OF THE INVENTION

This invention relates to a positive temperature coefficient (PTC) circuit protection device, more particularly to a PTC circuit protection device including a PTC polymer material having conductive non-carbonaceous particles, conductive carbon particles and a polymer matrix containing at least a primary polymer unit and a reinforcing polyolefin.

BACKGROUND OF THE INVENTION

A positive temperature coefficient (PTC) element exhibits a PTC effect that renders the same to be useful as a circuit protection device, such as a resettable fuse. The PTC element includes a PTC polymer material and first and second electrodes attached to two opposite surfaces of the PTC polymer material.

The PTC polymer material includes a polymer matrix that contains a crystalline region and a non-crystalline region, and a particulate conductive filler dispersed in the non-crystalline region of the polymer matrix and formed into a continuous conductive path for electrical conduction between the first and second electrodes. The PTC effect is a phenomena that when the temperature of the polymer matrix is raised to its melting point, crystals in the crystalline region start melting, which results in generation of a new non-crystalline region. As the new non-crystalline region is increased to an extent to merge into the original non-crystalline region, the conductive path of the particulate conductive filler will become discontinuous and the resistance of the PTC polymer material will sharply increase, thereby resulting in electrical disconnection between the first and second electrodes.

Examples of the particulate conductive filler are carbon particles, metal powders, conductive ceramic powders, metalized glass beads, etc. Since carbon particles have lower conductivity, the PTC polymer materials using carbon particles as the particulate conductive filler will have a resistivity greater than 0.1 ohm-cm at room temperature. Hence, for PTC circuit protection devices that require the PTC polymer materials to have a resistivity less than 1.0 ohm-cm or even less than 0.2 ohm-cm, carbon particles are no longer suitable for use alone as the particulate conductive filler.

Although the conductivity of the PTC polymer material can be considerably increased by using the particulate non-carbonaceous particles, such as metal powders, such conductive non-carbonaceous particles having high conductivity tend to result in undesired generation of electric arc within the PTC polymer material during use. The electric arc thus formed could deteriorate the molecular structure of the polymer matrix of the PTC polymer material, which would result in unstable electrical property of the PTC element and reduction in the service life of the PTC element.

U.S. Pat. No. 8,368,504 discloses a PTC polymer material that includes a polymer matrix and a conductive ceramic or metal filler dispersed in the polymer matrix. The polymer matrix is made from a polymer composition that contains at least a primary polymer unit and a reinforcing polyolefin. Although addition of the reinforcing polyolefin in the PTC polymer material can suppress generation of the electric arc in the PTC polymer material, the performance of the PTC polymer material in breakdown and thermal runaway tests is still not satisfactory.

SUMMARY OF THE INVENTION

Therefore, an object of the present invention is to provide a PTC circuit protection device that can overcome the aforesaid drawbacks associated with the prior art.

According to this invention, there is provided a PTC circuit protection device that comprises a PTC polymer material and two electrodes attached to the PTC polymer material. The PTC polymer material includes a polymer matrix and a particulate conductive filler dispersed in the polymer matrix. The conductive filler includes conductive non-carbonaceous particles and conductive carbon particles. The non-carbonaceous particles have a resistivity greater than that of the carbon particles. The polymer matrix is made from a polymer composition that contains at least a primary polymer unit and a reinforcing polyolefin. The primary polymer unit contains a base polyolefin and optionally a grafted polyolefin. The reinforcing polyolefin has a weight average molecular weight greater than that of the base polyolefin. The primary polymer unit and the reinforcing polyolefin are co-melted together and then solidified to form the polymer matrix. The base polyolefin has a melt flow rate ranging from 10 g/10 min to 100 g/10 min measured according to ASTM D-1238 under a temperature of 230° C. and a load of 12.6 Kg. The reinforcing polyolefin has a melt flow rate ranging from 0.01 g/10 min to 1 g/10 min measured according to ASTM D-1238 under a temperature of 230° C. and a load of 12.6 Kg. The conductive carbon particles have an average particle size ranging from 40 to 100 nm, a DBP oil-absorption ranging from 60 to 120 cc/100 g, and a volatile content ranging from 0.2 to 2.0 wt %. The primary polymer unit is in an amount ranging from 58 to 92 wt % and the reinforcing polyolefin is in an amount ranging from 8 to 42 wt % based on the total weight of the polymer composition. The polymer matrix is in an amount ranging from 10 to 14 wt % and the conductive filler is in an amount ranging from 86 to 90 wt % based on the total weight of the PTC polymer material. The conductive carbon particles are in an amount ranging from 1 to 14wt % based on the total weight of the PTC polymer material.

BRIEF DESCRIPTION OF THE DRAWING

In a drawing which illustrates an embodiment of the invention,

FIG. 1 is a schematic view of the embodiment of a PTC circuit protection device according to this invention.

DETAILED DESCRIPTION OF THE EMBODIMENT

FIG. 1 illustrates the embodiment of a PTC circuit protection device that comprises a PTC polymer material 2 and two electrodes 3 attached to the PTC polymer material 2.

The PTC polymer material 2 includes a polymer matrix 21 and a particulate conductive filler 22 dispersed in the polymer matrix 21. The particulate conductive filler 22 includes conductive non-carbonaceous particles and conductive carbon particles. The polymer matrix 21 is made from a polymer composition that contains at least a primary polymer unit and a reinforcing polyolefin. The primary polymer unit contains a base polyolefin and optionally a grafted polyolefin. The reinforcing polyolefin has a weight average molecular weight greater than that of the base polyolefin. The primary polymer unit and the reinforcing polyolefin are co-melted together and then solidified to form the polymer matrix 21.

The base polyolefin has a melt flow rate ranging from 10 g/10 min to 100 g/10 min measured according to ASTM D-1238 under a temperature of 230° C. and a load of 12.6 Kg. The reinforcing polyolefin has a melt flow rate ranging from 0.01 g/10 min to 1 g/10 min measured according to ASTM D-1238 under a temperature of 230° C. and a load of 12.6 Kg.

The conductive carbon particles have an average particle size ranging from 40 to 100 nm, a DBP oil-absorption ranging from 60 to 120 cc/100 g, and a volatile content ranging from 0.2 to 2.0 wt %.

The primary polymer unit is in an amount ranging from 58 to 92 wt % and the reinforcing polyolefin is in an amount ranging from 8 to 42 wt % based on the total weight of the polymer composition.

The polymer matrix 21 is in an amount ranging from 10 to 14 wt % and the particulate conductive filler 22 is in an amount ranging from 86 to 90 wt % based on the total weight of the PTC polymer material 2. The conductive carbon particles are in an amount ranging from 1 to 14 wt % based on the total weight of the PTC polymer material 2.

Preferably, the weight average molecular weight of the reinforcing polyolefin ranges from 600,000 g/mole to 1,500,000 g/mole.

Preferably, the weight average molecular weight of the base polyolefin ranges from 50,000 g/mole to 300,000 g/mole.

Preferably, the average particle size of the conductive carbon particles ranges from 58 to 83 nm, the DBP oil-absorption of the conductive carbon particles ranges from 75 to 113 cc/100 g, and the volatile content of the conductive carbon particles ranges from 0.8 to 1.0 wt %.

Preferably, the conductive non-carbonaceous particles are made from a material selected from the group consisting of titanium carbide, zirconium carbide, vanadium carbide, niobium carbide, tantalum carbide, chromium carbide, molybdenum carbide, tungsten carbide, titanium nitride, zirconium nitride, vanadium nitride, niobium nitride, tantalum nitride, chromium nitride, titanium disilicide, zirconium disilicide, niobium disilicide, tungsten disilicide, gold, silver, copper, aluminum, nickel, nickel-metallized glass beads, nickel-metallized graphite, Ti—Ta solid solution, W—Ti—Ta—Cr solid solution, W—Ta solid solution, W—Ti—Ta—Nb solid solution, W—Ti—Ta solid solution, W—Ti solid solution, Ta—Nb solid solution, and combinations thereof. More preferably, the conductive non-carbonaceous particles are made from titanium carbide.

Preferably, the conductive carbon particles are carbon black.

Preferably, the base polyolefin and the reinforcing polyolefin are polyethylene with different weight average molecular weights. More preferably, the base polyolefin and the reinforcing polyolefin are high density polyethylene (HDPE), and the grafted polyolefin is carboxylic acid anhydride grafted HDPE. The grafted polyolefin is used to increase adhesion of the PTC polymer material 2 to the electrodes 3.

The following examples and comparative examples are provided to illustrate the embodiment of the invention, and should not be construed as limiting the scope of the invention.

EXAMPLE

Example 1 (E1)

1.5 grams of high density polyethylene (HDPE) (purchased from Ticona company, catalog no.: GHR8110, having a weight average molecular weight of 600,000 g/mole and a melt flow rate of 0.96 g/10 min according to ASTM D-1238 under a temperature of 230° C. and a load of 12.6 Kg) serving as the reinforcing polyolefin, 8.25 grams of HDPE (purchased from Formosa plastic Corp., catalog no.: HDPE9002, having a weight average molecular weight of 150,000 g/mole and a melt flow rate of 45 g/10 min according to ASTM D-1238 under a temperature of 230° C. and a load of 12.6 Kg) serving as the base polyolefin, 8.25 grams of carboxylic acid anhydride grafted HDPE (purchased from DuPont, catalog no.: MB100D, having a weight average molecular weight of 80,000 g/mole and a melt flow rate of 75 g/10 min according to ASTM D-1238 under a temperature of 230° C. and a load of 12.6 Kg) serving as the grated polyolefin, 135 grams of titanium carbide powder (flakes, density: 4.92 g/cm$^3$, residual oxygen content: 0.4%, initial oxidation temperature: 450° C., electrical conductivity: 164×10$^4$ m$^{-1}\Omega^{-1}$) serving as the non-carbonaceous particles, and 1.5 grams of carbon black particles (trade name: Raven 430UB, average particle size: 82 nm, DBP oil-absorption: 75 cc/100 g, volatile content: 1.0 wt %, electrical conductivity: 2.86×10$^4$ m$^{-1}\Omega^{-1}$, commercially available from Columbian Chemicals Company) serving as the carbon particles were compounded in a Brabender mixer. The compounding temperature was 200° C., the stirring rate was 50 rpm, the applied pressure was 5 Kg, and the compounding time was 10 minutes. The compounded mixture was hot pressed so as to form a thin sheet of the PTC polymer material having a thickness of 0.28 mm. The hot pressing temperature was 200° C., the hot pressing time was 4 minutes, and the hot pressing pressure was 80 kg/cm$^2$. Two copper foil sheets were attached to two sides of the thin sheet and were hot pressed under 200° C. and 80 kg/cm$^2$ for 4 minutes to form a sandwiched structure of a PTC laminate. The PTC laminate was cut into a plurality of test samples with a size of 4.5 mm×3.2 mm. The electrical property of the test samples was determined (as shown in Table 1).

In Table 1, PE/m-PE represents the base polyolefin and the grafted polyethylene of the primary polymer unit and V-R represents the volume resistivity (ohm-cm). The PTC polymer material formed in Example 1 has a composition containing 1 wt % of the reinforcing polyolefin, 11 wt % of the primary polymer unit (the weight ratio of the base polyolefin to the grafted polyolefin is 1:1), 87 wt % of the conductive non-carbonaceous particles and 1 wt % of the conductive carbon particles. In addition, the polymer matrix thus formed has a polymer composition containing 91.7 wt % of the primary polymer unit and 8.3 wt % of the reinforcing polyolefin.

Examples 2-9 (E2-E9)

The procedures and conditions in preparing the test samples of Examples 2-9 (E2-E9) were similar to those of Example 1, except for the amounts of at least two of the reinforcing polyolefin, the base polyolefin, the non-carbonaceous particles and the carbon particles (as shown in Table 1). The electrical properties of the test samples of Examples 2-9 were determined (as shown in Table 1).

Examples 10-12 (E10-E12)

Examples 10-12 correspond respectively to Examples 4-6. The procedures and conditions in preparing the test samples of Examples 10-12 (E10-E12) were similar to those of Examples 4-6, respectively, except for the type of the reinforcing polyolefin.

The reinforcing polyolefin employed for each of Examples 10-12 is available from Ticona company under a catalog no. GUR4012, having a weight average molecular weight of 1,500,000 g/mole and a melt flow rate of 0.03 g/10 min according to ASTM D-1238 under a temperature of 230° C. and a load of 12.6 Kg.

The electrical properties of the test samples of Examples 10-12 were determined (as shown in Table 1).

Examples 13-15 (E13-E15)

Examples 13-15 correspond respectively to Examples 10-12. The procedures and conditions in preparing the test samples of Examples 13-15 (E13-E15) were similar to those of Examples 10-12, respectively, except for the carbon particles. The carbon particles are carbon black particles available from Columbian Chemicals Company under a trade name Raven 22, having an average particle size of 83 nm, a DBP oil-absorption of 114 cc/100 g, a volatile content of 0.8 wt %, and an electrical conductivity of $2.86 \times 10^4$ $m^{-1}\Omega^{-1}$.

The electrical properties of the test samples of Examples 13-15 were determined (as shown in Table 1).

Examples 16-18 (E16-E18)

Examples 16-18 correspond respectively to Examples 10-12. The procedures and conditions in preparing the test samples of Examples 16-18 (E16-E18) were similar to those of Examples 10-12, respectively, except for the carbon particles. The carbon particles employed are carbon black particles available from Columbian Chemicals Company under a trade name Raven 510UB, having an average particle size of 58 nm, a DBP oil-absorption of 90 cc/100 g, a volatile content of 0.9 wt %, and an electrical conductivity of $2.86 \times 10^4$ $m^{-1}\Omega^{-1}$.

The electrical properties of the test samples of Examples 16-18 were determined (as shown in Table 1).

Comparative Example 1 (CE1)

The procedures and conditions in preparing the test samples of Comparative Example 1 (CE1) were similar to those of Example 1, except that the composition of the PTC polymer material of Comparative Example 1 (as shown in Table 1) was free of the reinforcing polyolefin and the non-carbonaceous particles. The electrical properties of the test samples of Comparative Example 1 were determined (as shown in Table 1).

Comparative Example 2 (CE2)

The procedures and conditions in preparing the test samples of Comparative Example 2 (CE2) were similar to those of Example 1, except that the composition of the PTC polymer material of Comparative Example 2 (as shown in Table 1) was free of the reinforcing polyolefin and the carbon particles. The electrical properties of the test samples of Comparative Example 2 were determined (as shown in Table 1).

Comparative Examples 3 and 4 (CE3-CE4)

Comparative Examples 3 and 4 correspond respectively to Examples 4 and 6. The procedures and conditions in preparing the test samples of Comparative Examples 3 and 4 (CE3, CE4) were similar to those of Examples 4 and 6, respectively, except that the compositions of the PTC polymer materials of Comparative Examples 3 and 4 (as shown in Table 1) were free of the reinforcing polyolefin. The electrical properties of the test samples of Comparative Examples 3 and 4 were determined (as shown in Table 1).

Comparative Examples 5-7 (CE5-CE7)

Comparative Examples 5-7 correspond respectively to Examples 1, 4 and 8. The procedures and conditions in preparing the test samples of Comparative Examples 5-7 (CE5-CE7) were similar to those of Examples 1, 4 and 8, except that the conductive filler used in Comparative Examples 5-7 was free of the carbon particles (as shown in Table 1). The electrical properties of the test samples of Comparative Examples 5-7 were determined (as shown in Table 1).

Comparative Examples 8-10 (CE8-CE10)

Comparative Examples 8-10 correspond respectively to Comparative Examples 5-7. The procedures and conditions in preparing the test samples of Comparative Examples 8-10 (CE8-CE10) were similar to those of Comparative Examples 5-7, except for the type of the reinforcing polyolefin (as shown in Table 1). The electrical properties of the test samples of Comparative Examples 8-10 were determined (as shown in Table 1).

Comparative Examples 11-13 (CE11-CE13)

Comparative Examples 11-13 correspond respectively to Comparative Examples 8-10. The procedures and conditions in preparing the test samples of Comparative Examples 11-13 (CE11-CE13) were similar to those of Comparative Examples 8-10, except for the non-carbonaceous particles (as shown in Table 1). The non-carbonaceous particles employed in Comparative Examples 11-13 were $TiSi_2$ particles. The electrical properties of the test samples of Comparative Examples 11 to 13 were determined (as shown in Table 1).

Comparative Examples 14-16 (CE14-CE16)

Comparative Examples 14-16 correspond respectively to Comparative Examples 11-13. The procedures and conditions in preparing the test samples of Comparative Examples 14-16 (CE14-CE16) were similar to those of Comparative Examples 11-13, except for the amounts of the primary polymer unit and the non-carbonaceous particles (as shown in Table 1). The electrical properties of the test samples of Comparative Examples 14-16 (CE14-CE16) were determined (as shown in Table 1).

Comparative Examples 17 and 18 (CE17-CE18)

The procedures and conditions in preparing the test samples of Comparative Examples 17 and 18 were similar to those of Comparative Examples 11 and 14, respectively, except that the polymer matrix of each of Comparative Examples 17 and 18 was free of the reinforcing polyolefin (as shown in Table 1). The electrical properties of the test samples of Comparative Examples 17 and 18 were determined (as shown in Table 1).

Performance Tests

Breakdown Test

Ten test samples for each of E1-E18 and CE1-CE18 were subjected to a breakdown test to determine the passing ratio of the test samples of each of E1-E18 and CE1-CE18 at which the test samples were not burned down (n/10×100%, n represents the number of the test samples passing the breakdown test without burning down). The breakdown test was conducted under a DC voltage of 24 V and a current of 100 A for 60 seconds.

The results of the breakdown test are shown in Table 1.

Thermal Runway Test

Five test samples for each of E1-E18 and CE1-CE18 were subjected to a thermal runaway test. The thermal runaway test for each test sample was conducted by increasing stepwise the voltage applied to each test sample from an initial voltage of 5 Vdc to a final voltage of 60 Vdc under a fixed current of 100 A that is sufficient to enable each test sample to burn down. The applied voltage was increased at an increment of 5 Vdc per step and the duration time for each step was 2 minutes (i.e., each newly applied voltage lasted for two minutes). The maximum endurable voltage of each of the test samples of E1-E18 and CE1-CE18 was recorded. The results of the thermal runaway test are shown in Table 1.

TABLE 1

| Test Sample | Reinforcing polyolefin Polymer material Catalog no. | Reinforcing polyolefin Polymer composition (wt %) | Primary polymer unit Polymer Catalog no. | Primary polymer unit Polymer material (wt %) | Primary polymer unit Polymer composition (wt %) | Conductive non-carbonaceous particles Type | Conductive non-carbonaceous particles Wt % | Conductive carbon particles (Carbon Black) Catalog no. (Raven) | Conductive carbon particles Wt % | Sample property V-R, ohm | Sample property ohm*cm | Passing ratio of breakdown test 24 Vdc/ 100 A, (%) | Thermal runaway test Maximum endurable voltage, (Vdc) |
|---|---|---|---|---|---|---|---|---|---|---|---|---|---|
| E 1 | GHR8110 | 1 | 8.3% | PE/m-PE | 11 | 91.7% | TiC | 87 | 430UB | 1 | 0.00556 | 0.0191 | 100% | 50 |
| E 2 | GHR8110 | 1 | 10.0% | PE/m-PE | 9 | 90.0% | TiC | 89 | 430UB | 1 | 0.00420 | 0.0144 | 100% | 50 |
| E 3 | GHR8110 | 1 | 7.1% | PE/m-PE | 13 | 92.9% | TiC | 85 | 430UB | 1 | 0.00781 | 0.0268 | 100% | 60 |
| E 4 | GHR8110 | 3 | 25.0% | PE/m-PE | 9 | 75.0% | TiC | 87 | 430UB | 1 | 0.00499 | 0.0171 | 100% | 60 |
| E 5 | GHR8110 | 3 | 25.0% | PE/m-PE | 9 | 75.0% | TiC | 82 | 430UB | 6 | 0.01145 | 0.0393 | 100% | 60 |
| E 6 | GHR8110 | 3 | 25.0% | PE/m-PE | 9 | 75.0% | TiC | 74 | 430UB | 14 | 0.04452 | 0.1526 | 100% | 60 |
| E 7 | GHR8110 | 5 | 50.0% | PE/m-PE | 5 | 50.0% | TiC | 89 | 430UB | 1 | 0.00303 | 0.0104 | 100% | 60 |
| E 8 | GHR8110 | 5 | 41.7% | PE/m-PE | 7 | 58.3% | TiC | 87 | 430UB | 1 | 0.00431 | 0.0148 | 100% | 60 |
| E 9 | GHR8110 | 5 | 35.7% | PE/m-PE | 9 | 64.3% | TiC | 85 | 430UB | 1 | 0.00693 | 0.0238 | 100% | 60 |
| E 10 | GUR4012 | 3 | 25.0% | PE/m-PE | 9 | 75.0% | TiC | 87 | 430UB | 1 | 0.00487 | 0.0167 | 100% | 60 |
| E 11 | GUR4012 | 3 | 25.0% | PE/m-PE | 9 | 75.0% | TiC | 82 | 430UB | 6 | 0.01110 | 0.0381 | 100% | 60 |
| E 12 | GUR4012 | 3 | 25.0% | PE/m-PE | 9 | 75.0% | TiC | 74 | 430UB | 14 | 0.04422 | 0.1516 | 100% | 60 |
| E 13 | GUR4012 | 3 | 25.0% | PE/m-PE | 9 | 75.0% | TiC | 87 | 22 | 1 | 0.00503 | 0.0172 | 100% | 60 |
| E 14 | GUR4012 | 3 | 25.0% | PE/m-PE | 9 | 75.0% | TiC | 82 | 22 | 6 | 0.01232 | 0.0422 | 100% | 60 |
| E 15 | GUR4012 | 3 | 25.0% | PE/m-PE | 9 | 75.0% | TiC | 74 | 22 | 14 | 0.04554 | 0.1561 | 100% | 60 |
| E 16 | GUR4012 | 3 | 25.0% | PE/m-PE | 9 | 75.0% | TiC | 87 | 510UB | 1 | 0.00481 | 0.0165 | 100% | 60 |
| E 17 | GUR4012 | 3 | 25.0% | PE/m-PE | 9 | 75.0% | TiC | 82 | 510UB | 6 | 0.01067 | 0.0366 | 100% | 60 |
| E 18 | GUR4012 | 3 | 25.0% | PE/m-PE | 9 | 75.0% | TiC | 74 | 510UB | 14 | 0.04311 | 0.1478 | 100% | 60 |
| CE 1 | — | — | — | PE/m-PE | 40 | — | — | — | 430UB | 60 | 0.07950 | 0.2726 | 0% | 15 |
| CE 2 | — | — | — | PE/m-PE | 12 | — | TiC | 88 | — | — | 0.00558 | 0.0191 | 0% | 15 |
| CE 3 | — | — | — | PE/m-PE | 12 | — | TiC | 87 | 430UB | 1 | 0.00681 | 0.0233 | 10% | 15 |
| CE 4 | — | — | — | PE/m-PE | 12 | — | TiC | 74 | 430UB | 14 | 0.04990 | 0.1711 | 30% | 25 |
| CE 5 | GHR8110 | 1 | 8.3% | PE/m-PE | 11 | 91.7% | TiC | 88 | — | — | 0.00525 | 0.0180 | 60% | 15 |
| CE 6 | GHR8110 | 3 | 25.0% | PE/m-PE | 9 | 75.0% | TiC | 88 | — | — | 0.00496 | 0.0170 | 60% | 25 |
| CE 7 | GHR8110 | 5 | 41.7% | PE/m-PE | 7 | 58.3% | TiC | 88 | — | — | 0.00414 | 0.0142 | 70% | 25 |
| CE 8 | GUR4012 | 1 | 8.3% | PE/m-PE | 11 | 91.7% | TiC | 88 | — | — | 0.00514 | 0.0176 | 60% | 15 |
| CE 9 | GUR4012 | 3 | 25.0% | PE/m-PE | 9 | 75.0% | TiC | 88 | — | — | 0.00478 | 0.0164 | 60% | 25 |
| CE 10 | GUR4012 | 5 | 41.7% | PE/m-PE | 7 | 58.3% | TiC | 88 | — | — | 0.00403 | 0.0138 | 70% | 25 |
| CE 11 | GUR4012 | 1 | 8.3% | PE/m-PE | 11 | 91.7% | $TiSi_2$ | 88 | — | — | 0.00501 | 0.0172 | 50% | 20 |
| CE 12 | GUR4012 | 3 | 25.0% | PE/m-PE | 9 | 75.0% | $TiSi_2$ | 88 | — | — | 0.00485 | 0.0166 | 60% | 25 |
| CE 13 | GUR4012 | 5 | 41.7% | PE/m-PE | 7 | 58.3% | $TiSi_2$ | 88 | — | — | 0.00409 | 0.0140 | 60% | 25 |
| CE 14 | GUR4012 | 1 | 5.0% | PE/m-PE | 19 | 95.0% | $TiSi_2$ | 80 | — | — | 0.00696 | 0.0239 | 50% | 25 |
| CE 15 | GUR4012 | 3 | 15.0% | PE/m-PE | 17 | 85.0% | $TiSi_2$ | 80 | — | — | 0.00675 | 0.0231 | 60% | 30 |
| CE 16 | GUR4012 | 5 | 25.0% | PE/m-PE | 15 | 75.0% | $TiSi_2$ | 80 | — | — | 0.00662 | 0.0227 | 60% | 30 |
| CE 17 | — | — | — | PE/m-PE | 12 | 100.0% | $TiSi_2$ | 88 | — | — | 0.00565 | 0.0194 | 20% | 15 |
| CE 18 | — | — | — | PE/m-PE | 20 | 100.0% | $TiSi_2$ | 80 | — | — | 0.00711 | 0.0244 | 20% | 15 |

The comparison between the performance of the group "CE3 and CE4" (with the combination of the non-carbonaceous particles and the carbon particles as the conductive filler but without the reinforcing polyolefin in the polymer matrix) and the performance of the group "CE1 and CE2" (without the reinforcing polyolefin in the polymer matrix and the non-carbonaceous particles or the carbon particles) shows that only a low or moderate increase in the passing ratio of the breakdown test and in the maximum endurable voltage of the thermal runaway test can be achieved as a result of the combination of the non-carbonaceous particles and the carbon particles as the conductive filler. In particular, the comparison shows that the passing ratio of the breakdown test increases from 0% (CE2) to 10% for CE3 (with the inclusion of 1 wt % of the carbon particles in the conductive filler) and 30% for CE4 (with the inclusion of 14 wt % of the carbon particles in the conductive filler, and that the maximum endurable voltage of the thermal runaway test increases from 15V (CE2) to 25V for CE4 and does not increase for CE3.

In addition, the comparison between the performance of the group "CE5-CE16" (with the reinforcing polyolefin but without the carbon particles) and the performance of the group "CE17-CE18" (without the carbon particles and the reinforcing polyolefin) shows that only a low or moderate increase in the passing ratio of the breakdown test and in the maximum endurable voltage of the thermal runaway test can be achieved as a result of the inclusion of the reinforcing polyolefin (1-3 wt %) in the polymer matrix of the PTC polymer material. In particular, the comparison shows that the passing ratio of the breakdown test increases from 20% (CE17 or CE18) to 50-70% for CE5-CE16, and that the maximum endurable voltage of the thermal runaway test increases from 15V to 25-30V for CE6, CE7 and CE9-CE16 and does not increase for CE5 and CE8.

The composition of the PTC polymer material of the present invention, which differs from that of the group "CE3 and CE4" in that the former further includes the reinforcing polyolefin and differs from the group "CE5-CE16" in that the former further includes the carbon particles, exhibits a synergistic effect attributed to the combination of the reinforcing polyolefin (corresponding to the group "CE5-CE16"), the non-carbonaceous particles and the carbon particles (corresponding to the group "CE3 and CE4") in the PTC polymer material. The synergistic effect is illustrated as follows. As shown in Table 1, the passing ratio for CE8 is 60% and an increase of 10% passing ratio for CE3 as compared to CE2 can be recognized as being attributed to the inclusion of 1 wt % of carbon particles in the conductive filler. Hence, it may be assumed that the passing ratio of a composition modified from the composition of CE8 by substituting 1 wt % of carbon particles (CE3) for 1 wt % of TiC particles in the conductive filler of CE8 would proportionally add up to a total of 70% (=10%+60%). In a similar manner, it would be a reasonable presumption that the maximum endurable voltage of the modified composition would be maintained at a level of 15V (=0V+15V). In contrast to the modified composition, the passing ratio and maximum endurable voltage of E1 (which has a composition the same as the modified composition) are respectively 100% and 50V which are respectively much greater than the predicted values, 70% and 15V. The synergistic effect can be further illustrated by taking another example. As shown in Table 1, the passing ratio and the maximum endurable voltage for CE7 are respectively 70% and 25V (CE7 has an outstanding performance among Comparative Examples), and an increase of 30% passing ratio and an increase of 10V in the maximum endurable voltage for CE4 as compared to CE2 can be recognized as attributed to the inclusion of 14 wt % of carbon particles in the conductive filler. Hence, it may assume that the passing ratio and the maximum endurable voltage of a composition modified from the composition of CE7 by substituting 14 wt % of carbon particles (CE4) for 14 wt % of TiC particles in the conductive filler of CE7 would proportionally add up to a total of 100% (=30%+70%) and a total of 35V (25V+10V). In contrast, although the passing ratio of E6 (which has a composition similar to the modified composition) is the same as that of the modified combination, the maximum endurable voltage of E6 is 60V which is much greater than 35V. It is noted that generation of arc inside the PTC polymer material is the main cause for the burning down of the PTC circuit protection device. Hence, the comparison results of the maximum endurable voltage between Examples and combinations of Comparative Examples show that the PTC polymer material of the present invention is superior to suppress generation of arc inside the PTC polymer material as compared to those of the combinations of Comparative Examples.

In conclusion, with the inclusion of the conductive non-carbonaceous particles, the conductive carbon particles, and the reinforcing polyolefin in the composition of the PTC polymer material of the PTC circuit protection device of the present invention, the aforesaid arc generating problem associated with the prior art could be alleviated and the performance of the PTC polymer material in the breakdown and thermal runaway tests could be improved.

While the present invention has been described in connection with what is considered the most practical embodiment, it is understood that this invention is not limited to the disclosed embodiment but is intended to cover various arrangements included within the spirit and scope of the broadest interpretation and equivalent arrangements.

What is claimed is:
1. A PTC circuit protection device comprising:
a PTC polymer material; and
two electrodes attached to said PTC polymer material;
wherein said PTC polymer material includes a polymer matrix and a particulate conductive filler dispersed in said polymer matrix, said conductive filler including conductive non-carbonaceous particles and conductive carbon particles, said non-carbonaceous particles having a resistivity greater than that of said carbon particles;
wherein said polymer matrix is made from a polymer composition that contains at least a primary polymer unit and a reinforcing polyolefin, said primary polymer unit containing a base polyolefin and optionally a grafted polyolefin, said reinforcing polyolefin having a weight average molecular weight greater than that of said base polyolefin, said primary polymer unit and said reinforcing polyolefin being co-melted together and then solidified to form said polymer matrix;
wherein said base polyolefin has a melt flow rate ranging from 10 g/10 min to 100 g/10 min measured according to ASTM D-1238 under a temperature of 230° C. and a load of 12.6 Kg;
wherein said reinforcing polyolefin has a melt flow rate ranging from 0.01 g/10 min to 1 g/10 min measured according to ASTM D-1238 under a temperature of 230° C. and a load of 12.6 Kg;
wherein said conductive carbon particles have an average particle size ranging from 40 to 100 nm, a DBP oil-absorption ranging from 60 to 120 cc/100 g, and a volatile content ranging from 0.2 to 2.0 wt %;
wherein said primary polymer unit is in an amount ranging from 58 to 92 wt % and said reinforcing polyolefin is in an amount ranging from 8 to 42 wt % based on the total weight of said polymer composition;
wherein said polymer matrix is in an amount ranging from 10 to 14 wt % and said conductive filler is in an amount ranging from 86 to 90 wt % based on the total weight of said PTC polymer material; and
wherein said conductive carbon particles are in an amount ranging from 1 to 14 wt % based on the total weight of said PTC polymer material.
2. The PTC circuit protection device according to claim 1, wherein the weight average molecular weight of said reinforcing polyolefin ranges from 600,000 g/mole to 1,500,000 g/mole.

3. The PTC circuit protection device according to claim 1, wherein the weight average molecular weight of said base polyolefin ranges from 50,000 g/mole to 300,000 g/mole.

4. The PTC circuit protection device according to claim 1, wherein the average particle size of said conductive carbon particles ranges from 58 to 83 nm, the DBP oil-absorption of said conductive carbon particles ranges from 75 to 113 cc/100 g, and the volatile content of said conductive carbon particles ranges from 0.8 to 1.0 wt %.

5. The PTC circuit protection device according to claim 1, wherein said conductive non-carbonaceous particles are made from a material selected from the group consisting of titanium carbide, zirconium carbide, vanadium carbide, niobium carbide, tantalum carbide, chromium carbide, molybdenum carbide, tungsten carbide, titanium nitride, zirconium nitride, vanadium nitride, niobium nitride, tantalum nitride, chromium nitride, titanium disilicide, zirconium disilicide, niobium disilicide, tungsten disilicide, gold, silver, copper, aluminum, nickel, nickel-metallized glass beads, nickel-metallized graphite, Ti—Ta solid solution, W—Ti—Ta—Cr solid solution, W—Ta solid solution, W—Ti—Ta—Nb solid solution, W—Ti—Ta solid solution, W—Ti solid solution, Ta—Nb solid solution, and combinations thereof.

6. The PTC circuit protection device according to claim 1, wherein said conductive carbon particles are carbon black.

7. The PTC circuit protection device according to claim 1, wherein said base polyolefin and said reinforcing polyolefin are polyethylene.

* * * * *